Dec. 14, 1954  S. J. SPURGEON  2,697,016
MEANS FOR SECURING BEARING RACES TO SHAFTS AND THE LIKE
Filed Sept. 22, 1951
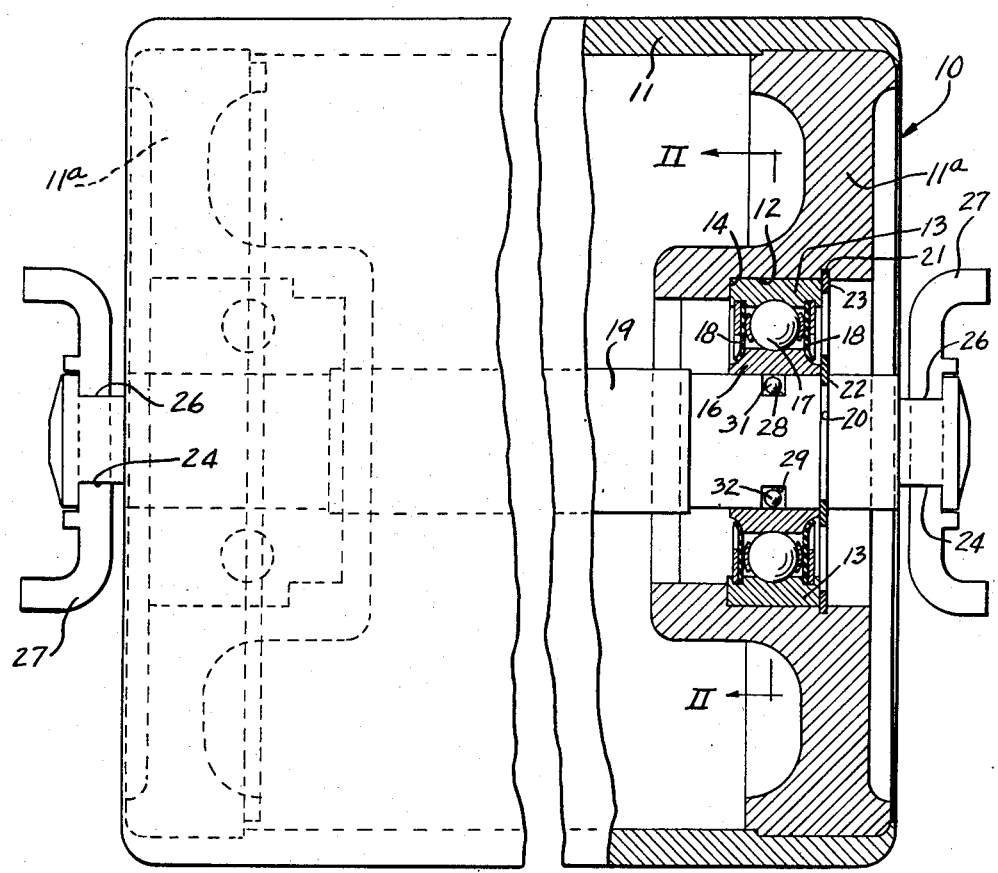
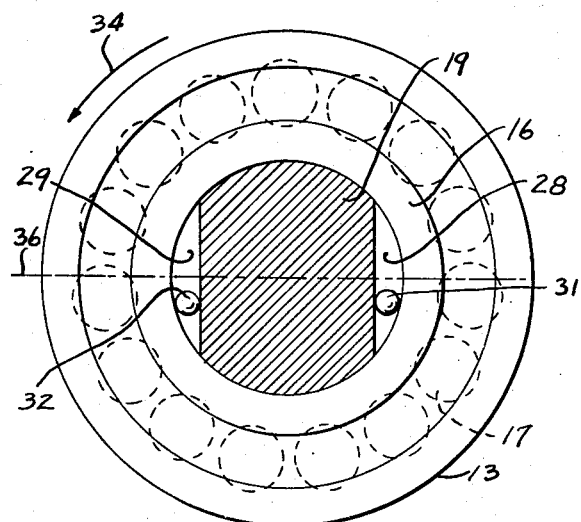
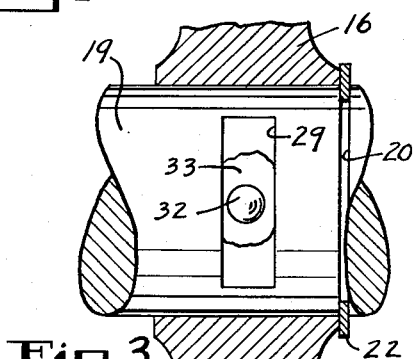
INVENTOR.
SAMUEL J. SPURGEON
BY Jennings & Carter
ATTORNEYS

United States Patent Office 2,697,016
Patented Dec. 14, 1954

2,697,016

MEANS FOR SECURING BEARING RACES TO SHAFTS AND THE LIKE

Samuel J. Spurgeon, Birmingham, Ala.

Application September 22, 1951, Serial No. 247,891

4 Claims. (Cl. 308—236)

My present invention relates to means for holding the race of anti-friction bearings against rotation relative to a shaft about which the race is placed, and more particularly to means for holding the inner race of such a bearing against turning relative to a shaft on which the inner race is mounted.

In assemblies embodying anti-friction bearings and shafts it is often found that the inner races of the bearings turn on the shaft after being placed thereabout. This rotation comes about due to inaccuracy of fit, expansion of the inner race, wear, and the like. This may cause the shaft itself to wear and partially destroys the desirable free running effect of the bearing. In a number of installations of such bearings the outer race is pressed firmly into an opening in a housing member and the assembly is completed by sliding the inner race onto a shaft. For ease of assembly it is desirable that the fit between the inner race and shaft be no tighter than a light press fit, thus speeding assembly of the parts and permitting them to be dismantled whenever necessary. Further, it often happens that the outer race is slightly contracted when pressed into its housing, binding the anti-friction balls or rollers, causing the inner race to have more than ordinary tendency to rotate against the shaft. In some cases the inner race can not be examined visually after assembly due to locking rings and the like which obscure it from view. Consequently, only such a bearing is assembled it is impossible to tell by visual inspection whether the inner race is rotating or standing still. All of these factors make highly desirable the provision of simple and easily assembled means which positively and effectively assure that the inner race remains stationary at all times during operation of the assembly of which the bearing is a part.

In view of the foregoing it is the prime object of my invention to provide means for locking the inner race of the bearing to its associated shaft, which means shall be inexpensive, positive in operation and easily assembled and disassembled.

A more specific object is to provide locking means for holding an inner race stationary which comprises a ball or the like interposed between the inner surface of the bore of the inner race and the shaft, whereby when the inner race commences to rotate the ball frictionally engages the same, holding it stationary.

A further object is to provide the shaft with a vertically disposed seat in which the locking member or ball is placed, eliminating the use of springs for holding the locking member in operating position.

A further object of my invention is to provide apparatus of the character designated in which the shaft is provided with a pair of oppositely disposed seats and balls in each of the seats, whereby the inner race is held against rotation regardless of the direction of rotation of the outer race and the balls.

Apparatus illustrating the features of my invention is shown in the accompanying drawings forming a part of this application in which:

Fig. 1 is a fragmental view, partly in section and showing a conveyor idler roll with my improved inner race locking mechanism applied thereto;

Fig. 2 is a detail sectional view taken generally along line II—II of Fig. 1; and, Fig. 3 is a fragmental side elevational view of one of the seats with a ball in place therein and held therein by a gob of lubricant or the like.

Referring now to the drawings for a better understanding of my invention I show the same in association with an idler roll 10 which may be a more or less standard idler roll such as is used for conveyor belts and the like. As is understood, the roll itself comprises an outer cylindrical shell 11. Pressed into the shell are heads 11a. The heads 11a are provided with bores 12 adapted to receive the outer race 13 of an anti-friction bearing. Ordinarily, the outer race of the bearing is pressed firmly into the bore 12 and the bore may be provided at its inner end with a shoulder 14 forming a stop for the outer race of the bearing. The bearing also comprises the usual inner race 16 and a row of steel balls 17. Likewise, the bearing may carry grease seals indicated at 18, customarily in the form of discs of flexible material such as rubber. The supporting shaft 19 may be grooved as at 20 and the recess or bore 12 may be grooved at 21. Locking rings 22 and 23 fit in the respective grooves 20 and 21 and hold the bearing as a whole in place.

The shaft 19 may be provided with oppositely disposed vertically extending slots 24 and 26 which are adapted to fit in a suitable slot provided in a mounting bracket 27. The entire roll thus is supported from the shaft 19 and the shaft is held against rotation by means of the slots 24 and 26 fitting into a socket in the bracket 27.

The idler roll described above is substantially standard arrangement for such devices. My invention consists in providing the shaft 19 with oppositely disposed, vertically extending grooves 28 and 29. The grooves 28 and 29 are disposed relative to the inner race 16 of the bearing so that the race overlies the grooves in the manner shown. In the grooves 28 and 29 I place small steel balls 31 and 32. The balls are of a diameter a few thousandths of an inch less than the depth of the grooves 28 and 29 for a reason later to appear.

By reference to Fig. 3 I show one means of holding the balls 31 or 32 in their respective grooves while the inner race 16 is being pressed onto the shaft. I use a small gob or quantity of paste-like lubricant 33 which is tacky enough to hold the ball for a limited time in position in the vertical grooves. I apply a small quantity of such lubricant approximately in the longitudinal center of the grooves 28 or 29 and stick the balls 31 and 32 therein. I am then enabled to insert the shaft 19 into the bore of the inner race 16.

I preferably employ a substance 33 which melts at a temperature in the neighborhood of from 90° F. to about 150° F. In the manufacture of idler rolls it is customary to paint certain portions thereof and to dry this paint by placing the entire assembly in an oven or by running it under a bank of infra-red lamps. During the process of drying the paint, the lubricant 33 melts and frees the balls 31 and 32, permitting them to fall by gravity into operating position as will be presently explained.

With the balls 31 and 32 assembled in their respective grooves it will be apparent that in the event the inner race 16 of the bearing tends to rotate in the direction of arrow 34, the ball 32 wedges between the bottom of its groove 29 and the inner surface of the bore of the inner race 16. This action effectively locks the race 16 against rotation relative to the shaft 19. At that same time, the opposite ball 31 is inoperative to prevent rotation of the inner race 16 when the inner race rotates in the direction of arrow 34, but is effective to similarly lock the inner race in the event the same rotates in the direction opposite that indicated by the arrow 34. Therefore, with my improved mechanism I assure that the inner race 16 remains stationary relative to the axle 19 regardless of the direction in which the roll 10 is driven, which direction determines the direction in which the inner race 16 rotates or tends to rotate.

In order that the relative sizes of the grooves, shaft and balls may be understood, and not by way of limitation, I cite the following example of mechanism which is operative for the purpose intended herein:

I have applied my invention to an idler roll for conveyors in which the shaft 19 was approximately ¾ of an inch in diameter. In this instance the maximum depth of the grooves as measured along line 36 was made equal to the diameter of the balls to be used plus 4/1000 of an inch. The balls selected were 3/32 inch in diameter, being steel balls such as are commonly used in anti-friction bearings. With balls of the diameter just mentioned, in place in grooves of the maximum depth just mentioned, the wedging angle between the balls and the inner surface of the bore of the inner race is adequate to securely lock the race against rotation during the operation of the idler.

A further advantage in my invention lies in the fact that after the rolls are fabricated and painted they are given a final testing to assure that they are free running. A skilled operator can tell, merely by rotating the rolls by hand, whether or not they are free running to the degree required. In view of the fact that one can not see the inner race after the roll is assembled it is important to know that the inner race is standing still so that the operator's test indicates that the actual free running of the roll results from the proper functioning of the anti-friction bearings and is not affected in any wise by rotation of the inner race relative to the shaft 19.

In actual practice I have found that my invention is satisfactory in every way and that it is simple and economical of construction. Obviously, if the roll is to operate in a single direction it is apparent that one of the grooves and its associated ball could be omitted, the one employed being placed on the side of the shaft adjacent that part of the inner race which tends to move downwardly.

While I have shown my invention in but one form, it will be obvious to those skilled in the art that it is not so limited but is suceptible of various changes and modifications without departing from the spirit thereof, and I desire, therefore, that only such limitations shall be placed thereupon as are specifically set forth in the appended claims.

What I claim is:

1. The combination with a horizontally disposed substantially round stationary shaft and an anti-friction bearing having inner and outer races wherein the inner race is mounted about the shaft for rotation in a given direction, of a vertically disposed groove in the side of the shaft over which the inner race fits, said groove being located on the side of said shaft adjacent a portion of the race that moves downwardly when the inner race rotates in said given direction, and a gravity actuated ball in said groove of a diameter to move freely in said groove and wedge between the bottom of the groove and the inner surface of the inner race upon rotation of the latter in said given direction.

2. For use in supporting an anti-friction bearing and holding the inner race thereof against rotation in response to rotation of the outer race thereof, a non-rotatable substantially horizontally disposed round shaft on which the inner race is rotatably mounted, a groove in a side of the shaft having a substantially vertically disposed bottom, said inner race overlying the groove, and a gravity actuated ball in said groove of a diameter less than the maximum depth of the groove and of a size to wedge between the bottom of the groove and the adjacent inner surface of the inner race.

3. In combination, an anti-friction bearing having inner and outer races, a fixedly mounted horizontal substantially round shaft, the inner race of the bearing fitting rotatably about the shaft, there being a vertical groove in the shaft encircled by the inner race and disposed adjacent the downward moving inner surface of the inner race when the same rotates in a given direction, and a gravity actuated ball in the groove of a diameter to move freely in said groove and to wedge between the bottom of the groove and the inner race upon rotation of the latter in said given direction.

4. In combination, a horizontally disposed non-rotatable substantially round shaft, there being substantially diametrically opposed vertical grooves in the shaft, an anti-friction bearing having an inner race fitting snugly and rotatably about the shaft over said grooves, and gravity actuated balls in said grooves of a diameter for one of the same to wedge between the bottom of its respective groove and the adjacent inner surface of the inner race when the inner race rotates in one direction on the shaft and for the other ball to similarly wedge upon opposite rotation of the inner race.

References Cited in the file of this patent

UNITED STATES PATENTS

| Number | Name | Date |
|--------|------|------|
| 382,637 | Curtis | May 8, 1888 |
| 422,025 | MacDonald | Feb. 25, 1890 |
| 691,548 | Johnson | Jan. 21, 1902 |
| 1,400,014 | Barber | Dec. 13, 1921 |
| 1,588,993 | Rahn | June 15, 1926 |
| 1,788,891 | Runge | Jan. 13, 1931 |
| 1,943,998 | Adams | Jan. 16, 1934 |
| 2,581,173 | Crankshaw | Jan. 1, 1952 |
| 2,584,256 | Brown | Feb. 5, 1952 |